(12) United States Patent
Lee et al.

(10) Patent No.: US 8,162,549 B2
(45) Date of Patent: Apr. 24, 2012

(54) OPTICAL ASSEMBLY AND PHOTOGRAPHING APPARATUS INCLUDING THE SAME

(75) Inventors: Chang-bae Lee, Gwacheon-si (KR); Seung-yong Kim, Goyang-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 16 days.

(21) Appl. No.: 12/894,608

(22) Filed: Sep. 30, 2010

(65) Prior Publication Data

US 2011/0091197 A1    Apr. 21, 2011

(30) Foreign Application Priority Data

Oct. 15, 2009    (KR) .................. 10-2009-0098409

(51) Int. Cl.
*G03B 17/00* (2006.01)
(52) U.S. Cl. ........................................... 396/448
(58) Field of Classification Search .......... 396/73, 396/448
See application file for complete search history.

(56) References Cited

U.S. PATENT DOCUMENTS

| | | | |
|---|---|---|---|
| 5,761,556 A * | 6/1998 | Ichino | 396/448 |
| 6,224,271 B1 * | 5/2001 | Park | 396/448 |
| RE39,752 E * | 7/2007 | Nomura et al. | 396/448 |
| 2006/0098975 A1 * | 5/2006 | Kobayashi | 396/448 |
| 2007/0217783 A1 * | 9/2007 | Nishijima | 396/448 |
| 2010/0027986 A1 * | 2/2010 | Katano | 396/448 |
| 2010/0226642 A1 * | 9/2010 | Hirabayashi | 396/448 |

* cited by examiner

*Primary Examiner* — Christopher Mahoney
(74) *Attorney, Agent, or Firm* — Drinker Biddle & Reath LLP (57) ABSTRACT

An optical assembly and/or a photographing apparatus including a lens mounting member on which at least one lens is mounted; a transfer portion for moving the lens mounting member; a guide member for guiding a movement of the lens mounting member; a base member on which the transfer portion and the guide member are arranged; and a lens cap apparatus having at least one barrier for opening and closing an optical path passing through the at least one lens, wherein the lens cap apparatus is configured to open and close the barrier by contact with the guide member when the lens cap apparatus is moved closer to or farther from the base member.

14 Claims, 13 Drawing Sheets

FORWARD
BACKWARD

OPTICAL ASSEMBLY AND PHOTOGRAPHING APPARATUS INCLUDING THE SAME

CROSS-REFERENCE TO RELATED PATENT APPLICATIONS

This application claims the benefit of Korean Patent Application No. 10-2009-0098409, filed on Oct. 15, 2009, in the Korean Intellectual Property Office, the entire disclosure of which is incorporated herein by reference.

BACKGROUND

1. Field of the Invention

Embodiments of the invention relate to a photographing apparatus, and more particularly, to an optical assembly including a lens cap apparatus and a photographing apparatus including the lens cap apparatus.

2. Description of the Related Art

A photographing apparatus is used to photograph an object. Often, the photographing apparatus includes an optical system having a lens, an imaging device, an image processing unit processing an electric signal received from the imaging device, and a memory for storing a photographed image of the object.

The optical system of the photographing apparatus may be configured to perform a focusing or zooming operation. Often, the lens is moved by a lens transferring device.

Often, the lens transferring device includes a lens frame in which the lens is inserted and a transferring unit to move the lens frame in the optical axis direction. A variety of lens transferring devices have been developed according to the structure and type of the photographing apparatus.

A lens cap apparatus to protect the lens is generally arranged in front of the lens of the photographing apparatus. The lens cap apparatus protects the lens from impacts in a closed state.

Since consumers want slim photographing apparatuses, there is a demand to efficiently arrange the lens cap apparatus within a limited inner space of the photographing apparatus.

SUMMARY

Therefore, there is a need in the art for an optical assembly. The optical assembly including a lens mounting member on which at least one lens is mounted; a transfer portion for moving the lens mounting member; a guide member for guiding a movement of the lens mounting member; a base member on which the transfer portion and the guide member are arranged; and a lens cap apparatus having at least one barrier for opening and closing an optical path passing through the at least one lens, wherein the lens cap apparatus is configured to open and close the barrier by contact with the guide member when the lens cap apparatus is moved closer to or farther from the base member.

The transfer portion may include a lead screw having a thread formed on an outer circumference thereof; and a driving motor for rotating the lead screw, and wherein the lens mounting member comprises a threaded portion contacting the thread of the lead screw.

An inclined surface may be formed on an end portion of the guide member. The lens cap apparatus may include a barrier driving portion configured to move the barrier; and a barrier support portion rotatably connected to the barrier, wherein the barrier driving portion comprises an operation protrusion formed to contact the inclined surface of the guide member.

The lens cap apparatus may be configured so that when the lens cap apparatus moves toward the base member, the operation protrusion contacts and slides down the inclined surface of the guide member, thereby rotating the barrier driving portion and closing the barrier.

The lens cap apparatus may be configured so that when the lens cap apparatus moves away from the base member, the operation protrusion moves up the inclined surface of the guide member, thereby rotating the barrier driving portion and opening the barrier.

A guide protrusion may be formed on the lens mounting member and a guide slot in which the guide protrusion is inserted is formed in the guide member.

A guide groove may be formed in the lens mounting member and a guide protruding portion inserted in the guide groove is formed on the guide member.

A photographing apparatus is presented. The photographing apparatus may include a lens mounting member on which at least one lens is mounted; a transfer portion for moving the lens mounting member; a guide member for guiding a movement of the lens mounting member; a base member on which the transfer portion and the guide member are arranged; a lens cap apparatus having at least one barrier for opening and closing an optical path passing through the at least one lens; an imaging device for converting image light passing through the lens to an electric signal; and a control portion for controlling the transfer portion, wherein the lens cap apparatus is configured to open and close the barrier by contact with the guide member when the lens cap apparatus is moved closer to or farther from the base member.

The transfer portion may include a lead screw having a thread formed on an outer circumference thereof; and a driving motor for rotating the lead screw, and wherein the lens mounting member comprises a threaded portion contacting the thread of the lead screw.

An inclined surface may be formed on an end portion of the guide member.

The lens cap apparatus may include a barrier driving portion configured to move the barrier; and a barrier support portion rotatably connected to the barrier, wherein the barrier driving portion comprises an operation protrusion formed to contact the inclined surface of the guide member.

The lens cap apparatus may be configured so that when the lens cap apparatus moves toward the base member, the operation protrusion contacts and slides down the inclined surface of the guide member, thereby rotating the barrier driving portion and closing the barrier.

The lens cap apparatus may be configured so that when the lens cap apparatus moves away from the base member, the operation protrusion moves up the inclined surface of the guide member, thereby rotating the barrier driving portion and opening the barrier.

A guide protrusion may be formed on the lens mounting member and a guide slot in which the guide protrusion is inserted is formed in the guide member.

A guide groove may be formed in the lens mounting member and a guide protruding portion inserted in the guide groove is formed on the guide member.

BRIEF DESCRIPTION OF THE DRAWINGS

The above and other features and advantages of embodiments of the invention will become more apparent by describing in detail exemplary embodiments thereof with reference to the attached drawings in which.

DETAILED DESCRIPTION OF THE INVENTION

The attached drawings for illustrating exemplary embodiments of the invention are referred to in order to gain a sufficient understanding of the invention, the merits thereof, and the objectives accomplished by the implementation of the embodiments of the invention. Hereinafter, embodiments of the invention will be described in detail by explaining exemplary embodiments of the invention with reference to the attached drawings. Like reference numerals in the drawings denote like elements.

Figure 1:
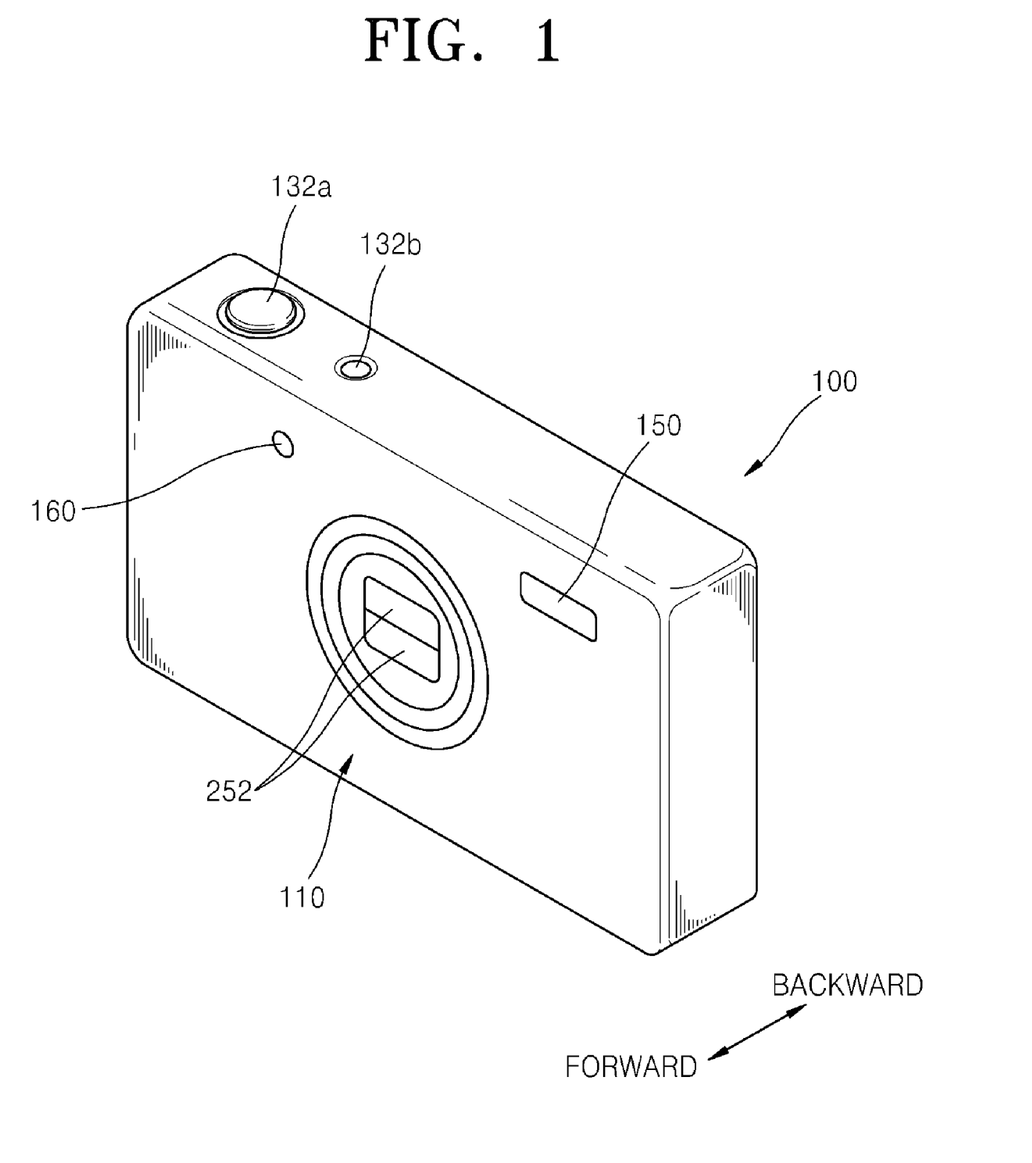
FIG. 1 is a perspective view illustrating the front surface of a photographing apparatus according to embodiments of the invention when power of the photographing apparatus is "off"
Figure 2:
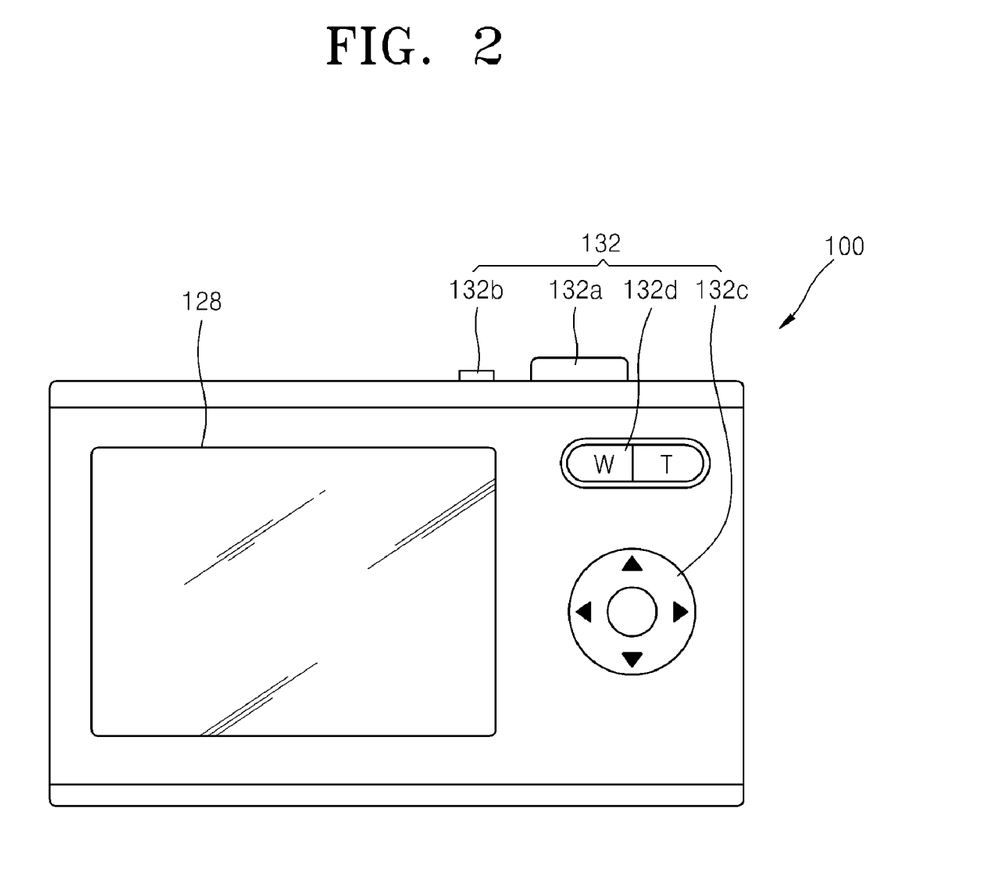
FIG. 2 is a rear view of the photographing apparatus of FIG. 1.
Figure 3:
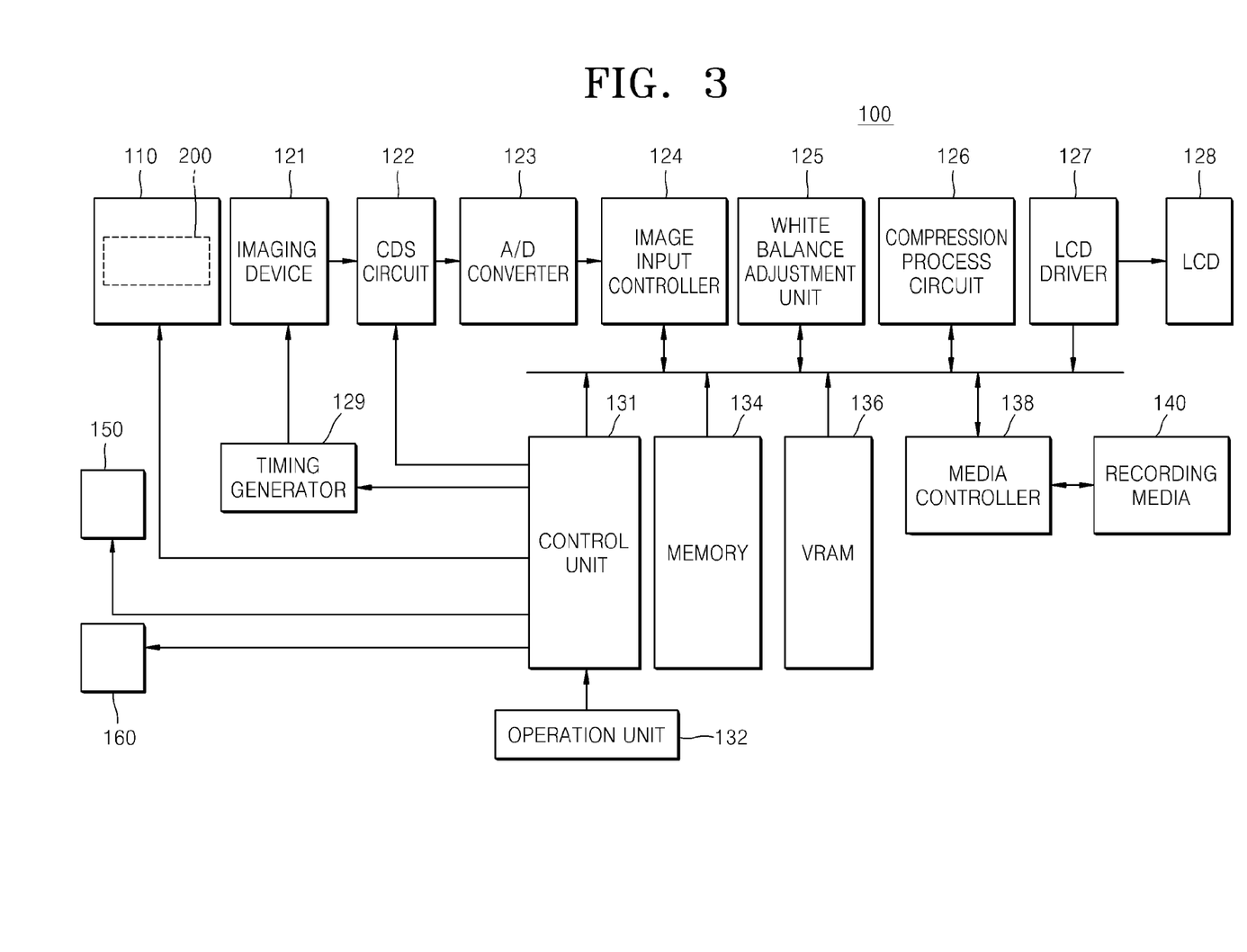
FIG. 3 schematically illustrates the internal structure of a photographing apparatus according to embodiments of the invention.

FIG. 1 is a perspective view illustrating the front surface of a photographing apparatus 100 according to embodiments of the invention when power of the photographing apparatus is "off". FIG. 2 is a rear view of the photographing apparatus of FIG. 1. FIG. 3 schematically illustrates the internal structure of a photographing apparatus according to embodiments of the invention.

Referring to FIG. 1, the photographing apparatus 100 according to embodiments of the invention is a compact digital camera. According to embodiments, the photographing apparatus 100 is a compact digital camera, but embodiments of the invention are not limited thereto. That is, embodiments are not limited to the type and format of the photographing apparatus 100. For example, the photographing apparatus may have a variety of types and formats of photographing apparatus such as a single-lens reflex camera with a detachable lens or a video camcorder.

Referring to FIGS. 1-3, the photographing apparatus 100 includes a barrel 110, an imaging device 121, an amplifier incorporated correlated double sampling (CDS) circuit 122, an analog/digital (A/D) converter 123, an image input controller 124, a white balance adjustment unit 125, a compression process circuit 126, a liquid crystal display (LCD) driver 127, an LCD 128, a timing generator 129, a control unit 131, a operation unit 132, a memory 134, a video random access memory (VRAM) 136, a media controller 138, a recording media 140, a flash 150, and an auxiliary light illumination unit 160.

The barrel 110 has a tube shape and an optical assembly 200 having a lens is included in the barrel 110. A detailed structure of the optical assembly 200 will be described later.

The imaging device 121 is arranged at a position where an image light passing through the barrel 110 is formed as an image and has a function to convert a formed image to an electric signal. Although a charge coupled device (CCD) is used as the imaging device 121, embodiments are not limited thereto. That is, a complementary metal oxide semiconductor (CMOS) to any other image sensor may be used as the imaging device 121 according to embodiment of the invention.

The CDS circuit 122 is a circuit incorporating a CDS circuit that is a sort of a sampling circuit removing noise of the electric signal output from the imaging device 121 and an amplifier amplifying the electric signal after removing the noise. Although in embodiments the CDS circuit 122 is configured by using a circuit incorporating the CDS circuit and the amplifier, the CDS circuit and the amplifier may be provided as separate circuits.

The A/D converter 123 converts an analog electric signal generated by the imaging device 121 to a digital signal. The image input controller 124 transmits a digital image signal to the control unit 131. The white balance adjustment unit 125 adjusts a white balance value using photographing image data output from the imaging device 121.

Although the white balance adjustment unit 125 according to embodiments is configured by a separate circuit from the control unit 131, embodiments are not limited thereto. For example, the white balance adjustment unit 125 may be formed as a part of the control unit 131.

Also, although the white balance adjustment unit 125 according to embodiments is configured by an electric circuit, embodiments are limited thereto. For example, the white balance adjustment unit 125 may be formed of software.

The compression process circuit 126 performs a compressing process to compress data of a photographed image into an appropriate format. The compression format of an image may be reversible or irreversible. The appropriate format may include, for example, a joint photographic experts group (JPEG) format or a JPEG 2000 format.

The LCD 128 functions as a display unit by displaying a live view before performing a photographing operation, a variety of setting screens of the photographing apparatus 100, or photographed images. Image data or various information of the photographing apparatus 100 is displayed on the LCD 128 by the LCD driver 127. Although in embodiments the LCD 128 is used as the display unit, embodiments are not limited thereto. For example, an organic light-emitting diode (OLED) or a field emission display (FED) may be used as the display unit.

The timing generator 129 inputs a timing signal to the imaging device 121. A shutter speed is determined based on the timing signal generated by the timing generator 129. That is, the driving of the imaging device 121 is controlled by the timing signal from the timing generator 129. As the image light is input within the time when the imaging device 121 is driven, an electric signal that forms the basis of the image data is generated.

The control unit 131 executes a command of a signal system on the imaging device 121 or the CDS circuit 122, or a command of an operation system on the operation of the operation unit 132. Although embodiments include only one control unit, the command of the signal system and the command of the operation system may be separately executed by different control units.

Also, the control unit 131 performs an image processing function. That is, the control unit 131 performs a function to process photographing data transmitted by the imaging device 121. The control unit 131 performs gamma correction of the transmitted photographing data.

The gamma correction signifies encoding of information according to nonlinearity in the sight of a human. That is, since the vision of a human linearly reacts to brightness according to Weber's law, when a limited bit depth is given and brightness of light is linearly recorded, posterization is generated. Thus, to produce maximum image quality under a given bit depth, a nonlinear function is used to encode, which is referred to as gamma correction.

The gamma correction of the control unit 131 is to output a gamma corrected image signal according to a gamma curve. For example, the input illumination level of a 12 bits image signal is corrected to an 8-bit illumination level to be output.

The operation unit 132 includes a function as a photographing mode selection unit and includes members to operate the photographing apparatus 100 or set various settings for photography. As illustrated in FIG. 2, the members of the operation unit 132 include a shutter button (132a) initiating a photographing operation, a power button 132b, a selection button 132c to select a photographing mode or a photographing drive mode and set effect parameters, and a zoom button 132d for zooming.

Although in FIGS. 1 and 2 the shutter button 132a, the power button 132b, the selection button 132c, and the zoom button 132d are illustrated as the operation unit 132, more buttons and operation keys may be arranged to constitute the operation unit 132.

The memory 134, as an example of an image memory unit, temporarily memorizes data of photographed images or data needed for operation. The memory 134 has a memory capacity sufficient to memorize a plurality of images. The reading/writing of an image from/to the memory 134 is controlled by an image input controller 124.

The VRAM 136 maintains the content displayed on the LCD 128. The resolution or maximum number of colors of the LCD 128 is dependent on the capacity of the VRAM 136.

The recording media 140, as an example of an image recording unit, records a photographed image. The input/output of the recording media 140 is controlled by a media controller 138. A secure digital (SD) card or a multimedia card (MMC), which is a card type memory device used to record data, may be used as the recording media 140.

The flash 150 is used to instantly illuminate bright light when photographing is performed in a dark place. A flash mode using the flash 150 includes an auto flash mode, a forced flash mode, a flash prohibition mode, a red eye reduction mode, and a slow sync mode.

The auxiliary light illumination unit 160 supplies auxiliary light to the object so that the photographing apparatus 100 may automatically, quickly, and accurately focus when the amount of light is insufficient or during night photography.

Figure 4:
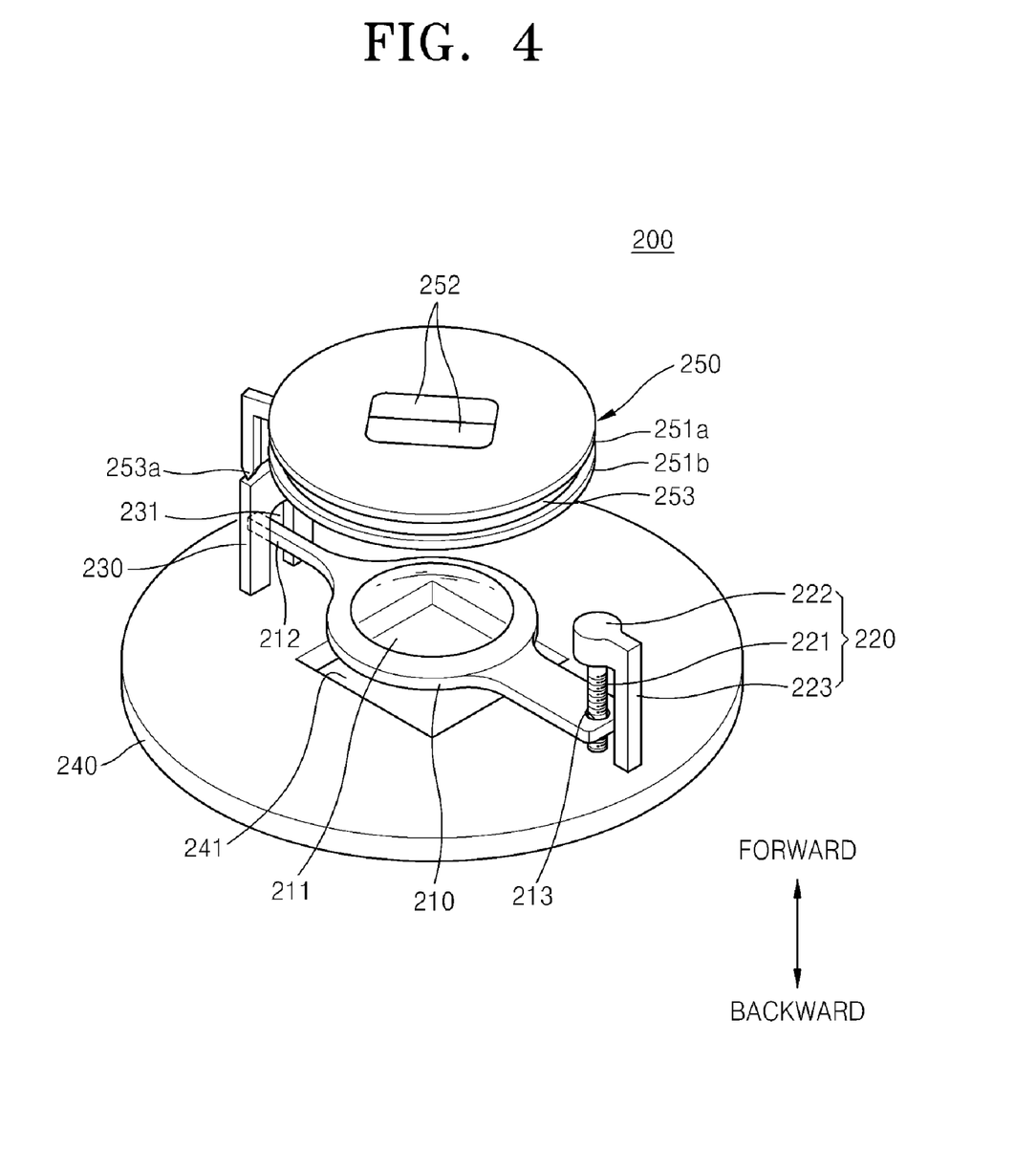
FIG. 4 is a perspective view of an optical assembly according to embodiments of the invention, in which the operation protrusion contacts the guide member.
Figure 5:
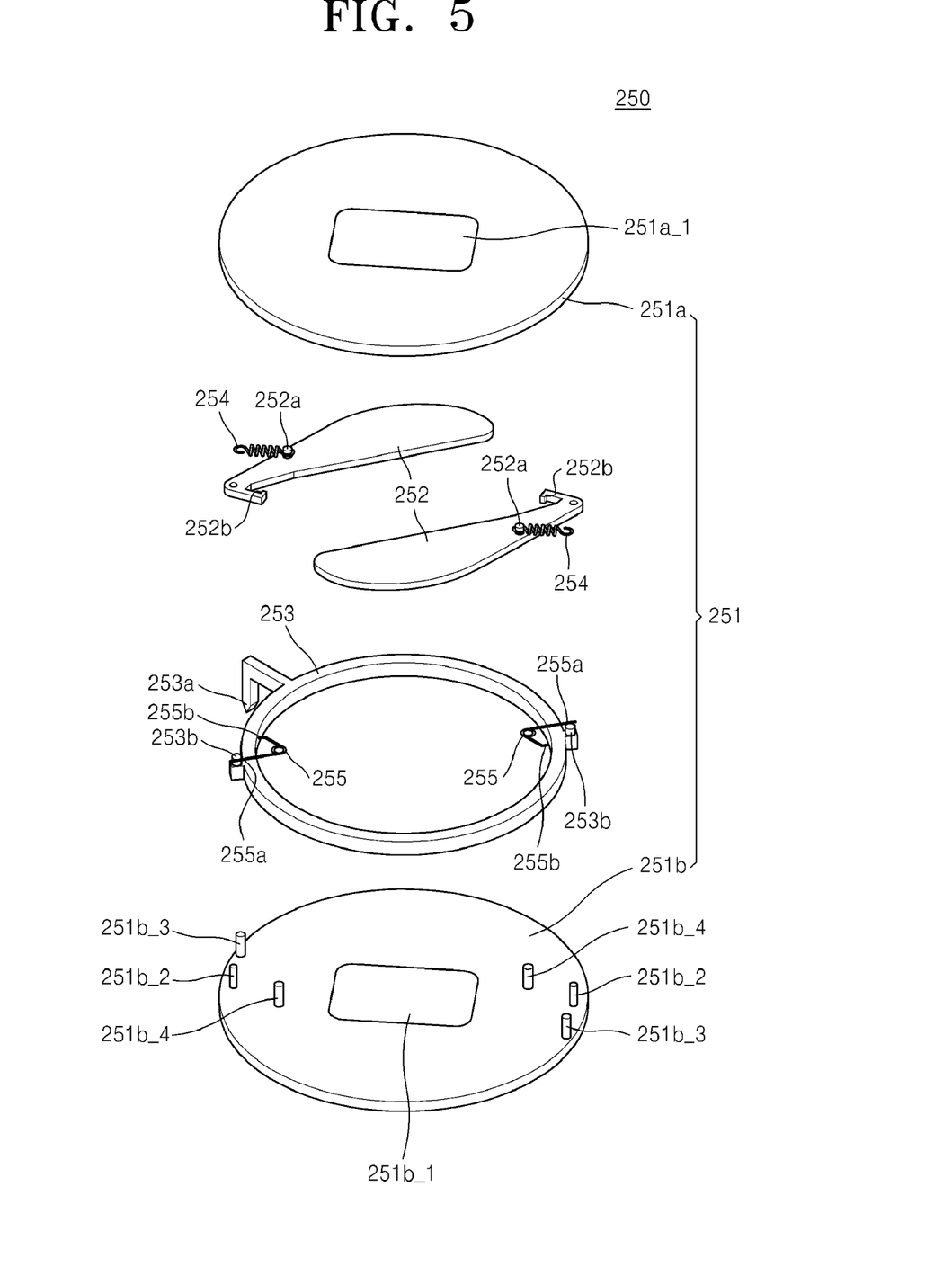
FIG. 5 is an exploded perspective view of a lens cap apparatus according to embodiments of the invention.

The optical assembly 200 will be described with reference to FIGS. 4 and 5. FIG. 4 is a perspective view of an optical assembly according to embodiments of the invention, in which the operation protrusion contacts the guide member. FIG. 5 is an exploded perspective view of a lens cap apparatus according to embodiments of the invention.

As illustrated in FIG. 4, the optical assembly 200 includes a lens mounting member 210, a transfer portion 220, a guide member 230, a base member 240, and a lens cap apparatus 250. At least one lens 211 is installed at the central portion of the lens mounting member 210. In embodiments, the lens 211 of the lens mounting member 210 is used for focusing.

Although in embodiments the optical assembly 200 includes only the lens 211 of the lens mounting member 210 as a lens, embodiments are not limited thereto. That is, although the optical assembly 200 according to embodiments employs a structure including only the lens 211, for convenience of explanation, the optical assembly according to embodiments may include not only the lens 211 of the lens mounting member 210 but many other lenses. For example, the optical assembly 200 may include not only the lens for focusing but many lenses performing other functions. For example, the optical assembly 200 may include a zoom lens performing a zooming function. Also, a lens group including a plurality of lenses may be arranged in the optical assembly 200. Although it is not illustrated, an aperture or a shutter may be arranged in the optical assembly 200.

Figure 6:
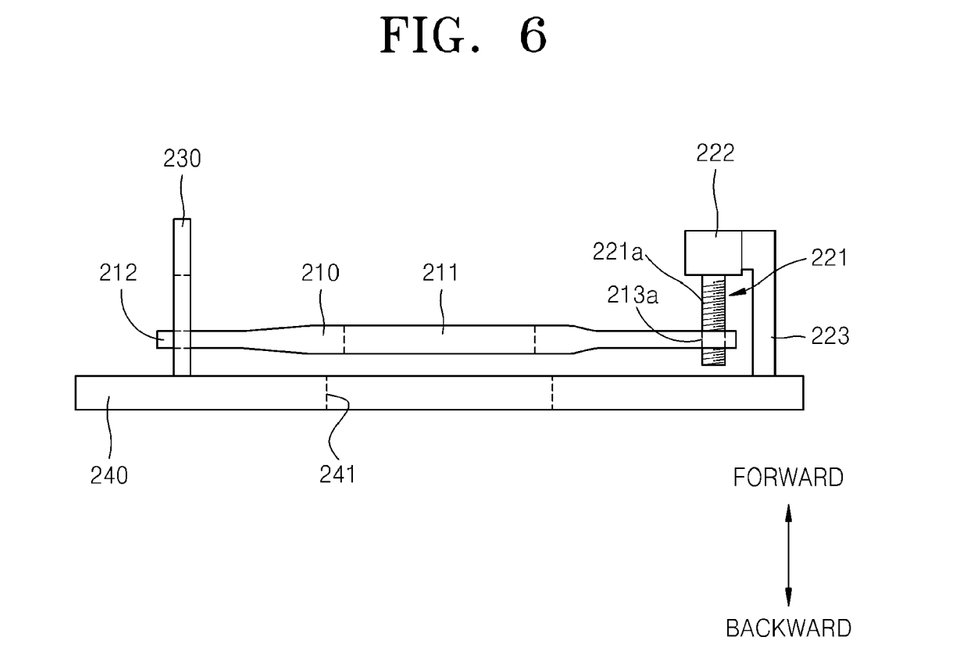
FIG. 6 is a cross sectional view illustrating that the lens mounting member is located close to the base member, according to embodiments of the invention.

A guide protrusion 212 is formed at one side of the lens mounting member 210 and a hole 213 is formed at the other side thereof. In embodiments, the guide protrusion 212 has a rod shape and, as illustrated in FIG. 6, a threaded portion 213a is formed in the inner circumference of the hole 213.

The transfer portion 220 transfers the lens mounting member 210 in an optical axis direction and includes a lead screw 221, a driving motor 222, and a motor support portion 223. A thread 221a is formed on the outer surface of the lead screw 221. The thread 221 contacts the threaded portion 213a of the lens mounting member 210 and converts the rotation motion of the lead screw 221 to the linear motion of the lens mounting member 210.

Although in embodiments, the hole 213 where the threaded portion 213a is formed is formed in the lens mounting member 210 and the threaded portion 213a contacts the thread 221a of the lead screw 221, embodiments are not limited thereto. That is, the lens mounting member 210 may be moved in other ways.

For example, a clip portion having a thread thereon is installed in the lens mounting member 210 and the clip portion contacts the thread 221a of the lead screw 221 to convert the rotation motion of the lead screw 221 to the linear motion of the lens mounting member 210.

The driving motor 222 moves the lens mounting member 210 according to a control signal of the control unit 131 of the photographing apparatus 100. That is, the shaft of the driving motor 222 is connected to the lead screw 221 and rotated clockwise or counterclockwise according to the control signal.

A general motor or a geared motor may be used as the driving motor 222. The motor support portion 223 installs the driving motor 222 on the base member 240.

The guide member 230 is installed on the base member 240 and guides the movement of the lens mounting member 210 to drive the lens cap apparatus 250. A guide slot 231 is formed in the guide member 230. An inclined surface 232 is formed at an end portion of the guide member 230.

The guide protrusion 212 of the lens mounting member 210 is inserted in the guide slot 231 to slide along the guide slot 231. The width of the guide slot 231 is formed such that the guide protrusion 212 can be sufficiently inserted in the guide slot 231 and simultaneously the shaking movement of the guide protrusion 212 during sliding can be minimized. The length of the guide slot 231 is appropriately determined according to the movement distance of the lens mounting member 210.

The shape of the inclined surface 232 formed at the end portion of the guide member 230 is formed to be the same as the direction along which an operation protrusion 253a moves when a barrier driving portion 253 rotates. That is, since the movement direction of the operation protrusion 253a has an arc shape, the shape of the inclined surface 232 has the arc shape. When the operation protrusion 253a of the lens cap apparatus 250 contacts and slides along the inclined surface 232, the shape of the inclined surface 232 enables the rotation motion of the barrier driving portion 253 connected to the operation protrusion 253a.

The base member 240 has a plate shape and an opening 241 through which the image light passes is formed in the center of the base member 240. The lens cap apparatus 250 protects the lens 211 and opens/closes the optical path of the image light. The lens cap apparatus 250, as illustrated in FIG. 5, includes a barrier support portion 251, a pair of barriers 252, a barrier driving portion 253, a pair of first elastic members 254, and a pair of second elastic members 255.

The barrier support portion 251 includes an upper barrier support portion 251a and a lower barrier support portion 251b. Opening portions 251a_1 and 251b_1 are respectively formed in the upper and lower barrier support portions 251a and 251b. The image light passes through the opening portions 251a_1 and 251b_1.

The barriers 252 are hinge coupled to the lower barrier support portion 251b. That is, the barriers 252 are mounted on a hinge shaft 251b_2 installed on the lower barrier support portion 251b and rotated around the hinge shaft 251b_2. The barriers 252 are provided in a pair on the lower barrier support portion 251b and formed of a material capable of blocking the image light.

Although embodiments of the barriers 252 are rotatably attached to the lower barrier support portion 251b, embodiments are not limited thereto. That is, the barriers 252 according to embodiments may be hinge coupled to the upper barrier support portion 251a.

Although in embodiments the barriers 252 are installed on the barrier support portion 251, embodiments are not limited thereto. That is, the number of the barriers 252 installed on the barrier support portion 251 is not limited so that, for example, four barriers may be installed on the barrier support portion 251.

The barrier driving portion 253 may have a ring shape as a whole and arranged between the upper and lower barrier support portions 251a and 251b. The barrier driving portion 253 may be configured to rotate the barriers 252.

The barrier driving portion 253 includes an operation protrusion 253a and a projection portion 253b. The operation protrusion 253a extends outside the barrier driving portion 253 and protrudes downwardly. The operation protrusion 253a is configured to contact the inclined surface 232 of the guide member 230. An end portion 255a of the second elastic member 255 is coupled to the projection portion 253b.

The first elastic members 254 are formed of extension coil springs. One end of each of the first elastic members 254 is coupled to a first installation pin 251b_3 of the lower barrier support portion 251b and the other end thereof is coupled to an installation pin 252a of each of the barriers 252.

The second elastic members 255 are formed of twisted coil springs. An intermediate portion of each of the second elastic members 255 is rotatably coupled to a second installation pin 251b_4 of the lower barrier support portion 251b. One end of each of the second elastic members 255 is coupled to the projection portion 253b of the barrier driving portion 253 and the other end thereof is coupled to an operation end portion 252b of each of the barriers 252.

Although the lens cap apparatus 250 of in embodiments includes the barrier support portion 251, the pair of barriers 252, the barrier driving portion 253, the pair of first elastic members 254, and the pair of second elastic members 255, embodiments are not limited thereto. That is, it would suffice for the lens cap apparatus to have a structure to open/close the barriers 252 by contacting the inclined surface 232 of the guide member 230. Thus, if a detailed structure is different from that of the lens cap apparatus 250 of embodiments described herein, the different structure may be included in the scope of embodiments of the invention.

Figure 7:
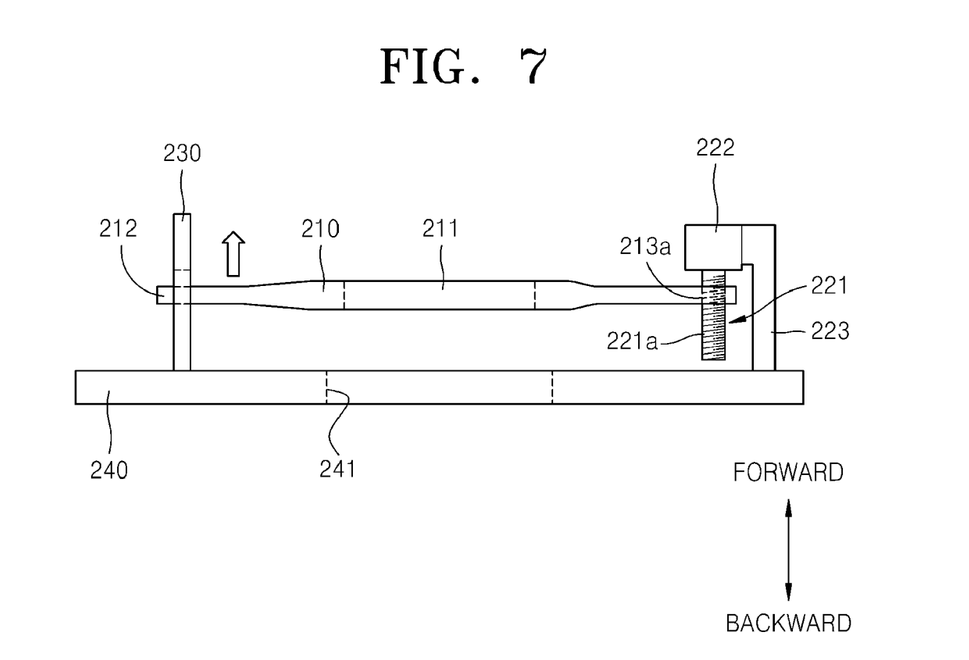
FIG. 7 is a cross sectional view illustrating that the lens mounting member is moved to the front side, according to embodiments of the invention.

Next, the movement of the lens mounting member 210 of the photographing apparatus 100 according to embodiments of the invention will be described below with reference to FIGS. 6 and 7. FIG. 6 is a cross sectional view illustrating that the lens mounting member 210 is located close to the base member 240, according to embodiments of the invention. FIG. 7 is a cross sectional view illustrating that the lens mounting member 210 is moved to the front side, according to embodiments of the invention.

Referring to FIG. 6, when the control unit 131 of the photographing apparatus 100 drives the driving motor 222, the lead screw 221 is rotated. When the lead screw 221 is rotated, the thread 221a of the lead screw 221 transfers the rotation force to the threaded portion 213a of the lens mounting member 210.

Then, as illustrated in FIG. 7, the lens mounting member 210 where the threaded portion 213a is formed moves forward so that the lens 211 may be moved. Accordingly, as the guide protrusion 212 of the lens mounting member 210 inserted in the guide slot 231 of the guide member 230 is moved, the movement of the lens mounting member 210 is guided. To move the lens mounting member 210 backward, the control unit 131 controls the driving motor 222 to rotate the lead screw 221 in the opposite direction.

Figure 8:
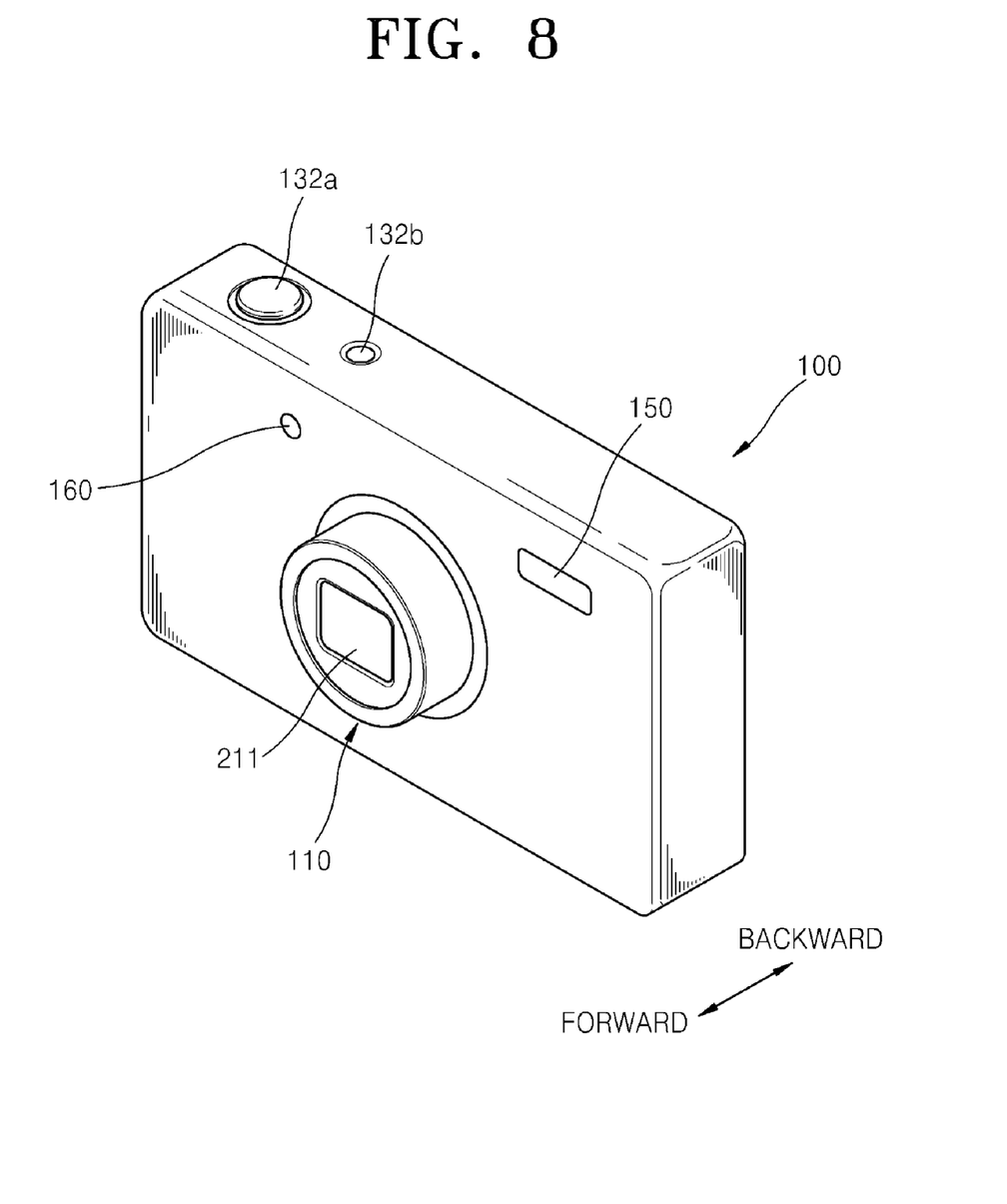
FIG. 8 is a perspective view illustrating the front surface of a photographing apparatus according to embodiments of the invention when power of the photographing apparatus is "on"
Figure 9:
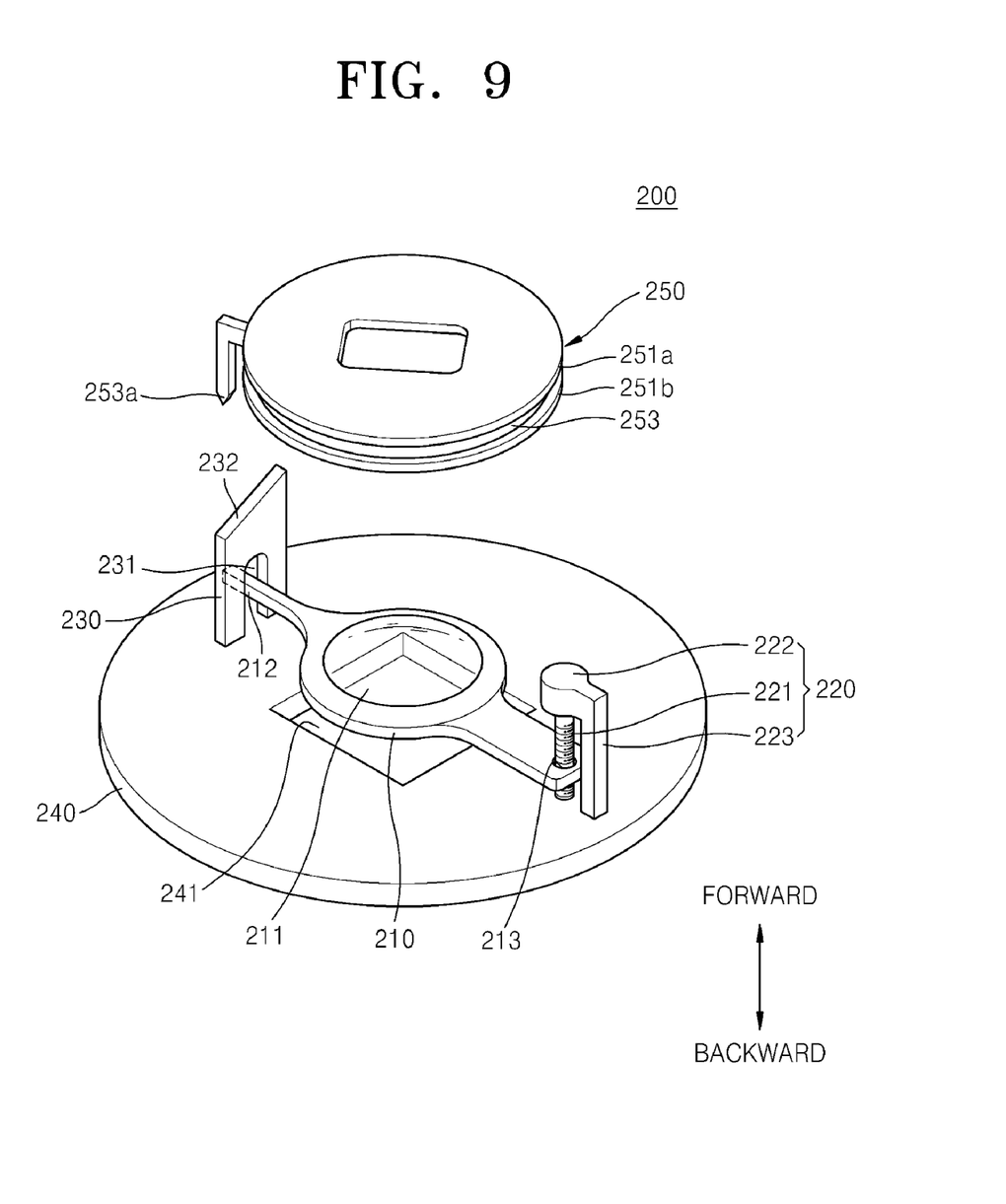
FIG. 9 is a perspective view of the optical system in which the operation protrusion is separated from the guide member.

The operation of the lens cap apparatus 250 of the photographing apparatus 100 according to embodiments will be briefly described with reference to FIGS. 8-15. FIG. 8 is a perspective view illustrating the front surface of a photographing apparatus according to embodiments when power of the photographing apparatus is "on". FIG. 9 is a perspective view of the optical system in which the operation protrusion is separated from the guide member.

Figure 10:
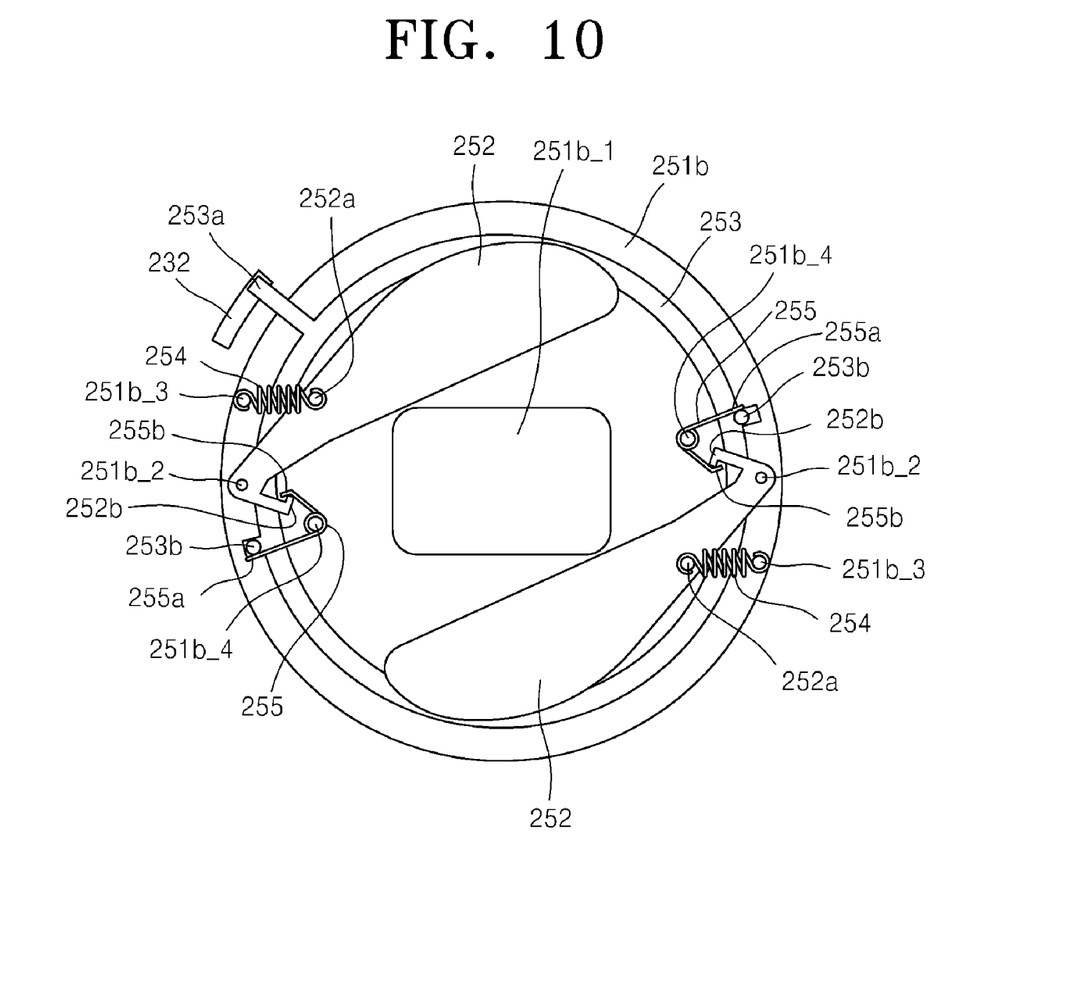
FIG. 10 is a plan view illustrating, except for the upper barrier support unit, that the barriers of the lens cap apparatus is in an open state according to embodiments of the invention.
Figure 11:
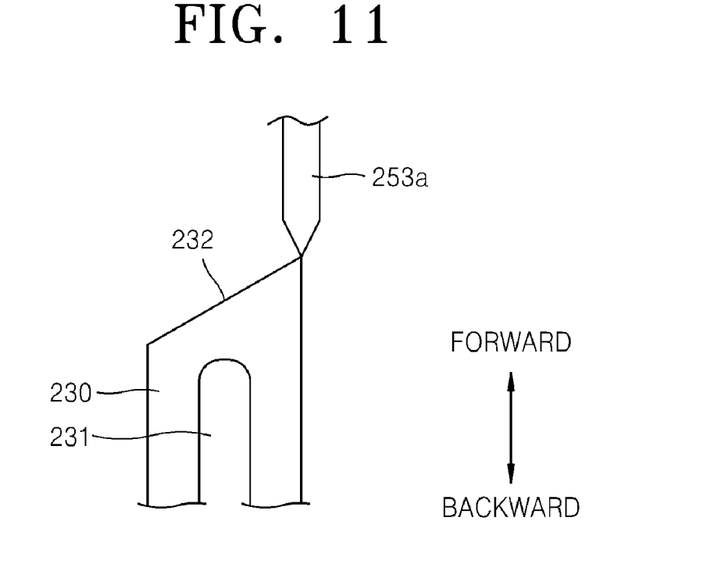
FIG. 11 schematically illustrates that the operation protrusion starts to contact the inclined surface of the guide member, according to embodiments of the invention.
Figure 12:
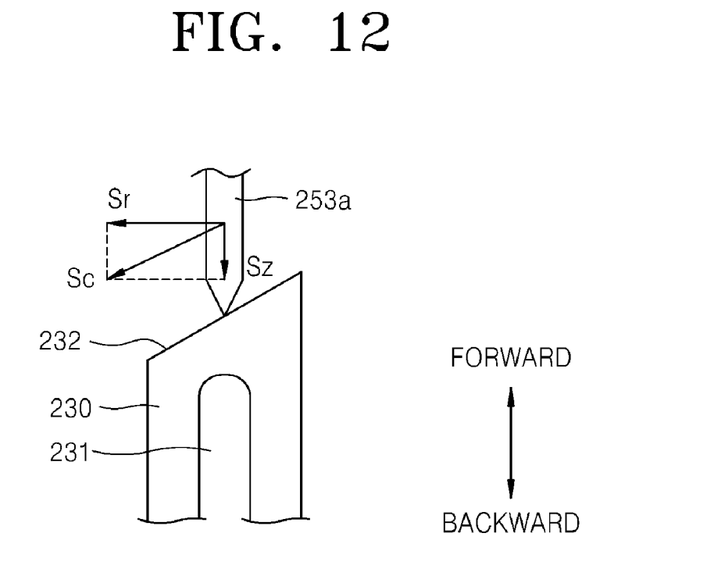
FIG. 12 schematically illustrates that the operation protrusion contacts and slides along the inclined surface of the guide member, according to embodiments of the invention.
Figure 13:
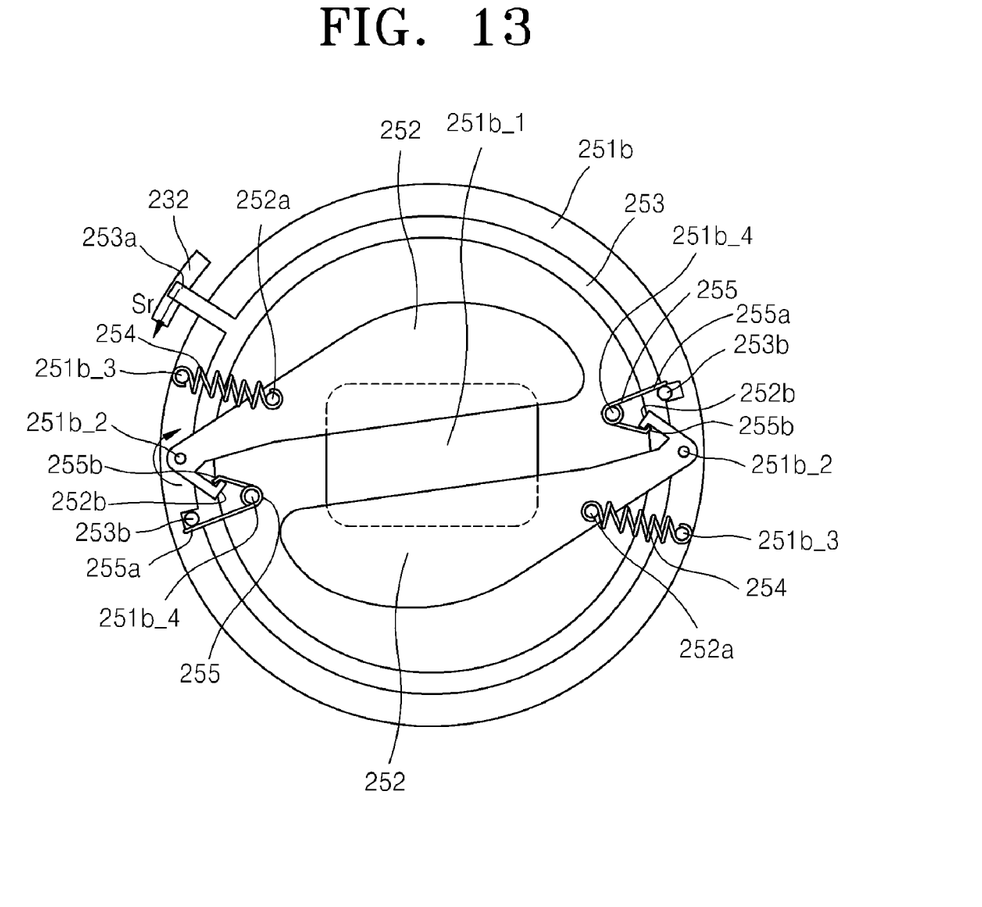
FIG. 13 is a plan view illustrating, except for the upper barrier support unit, that the barriers of the lens cap apparatus is the middle of changing from an open state to a closed state according to embodiments of the invention.
Figure 14:
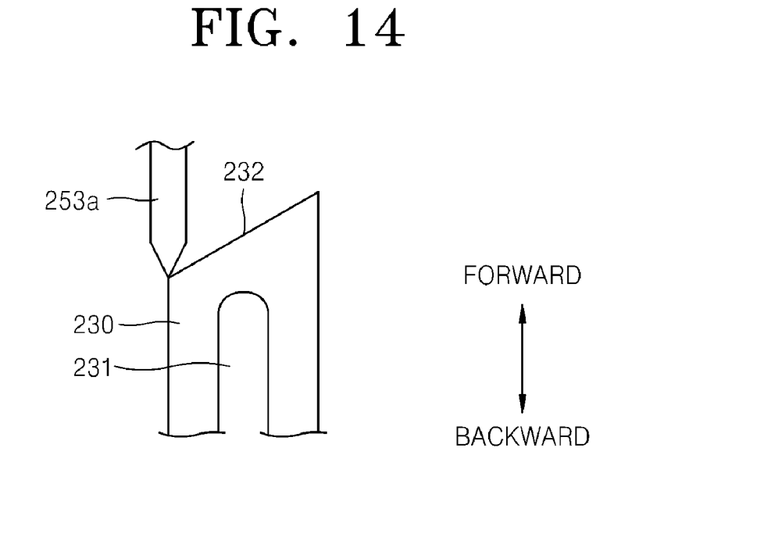
FIG. 14 schematically illustrates that the operation protrusion reaches the end point of the inclined surface of the guide member, according to embodiments of the invention.
Figure 15:
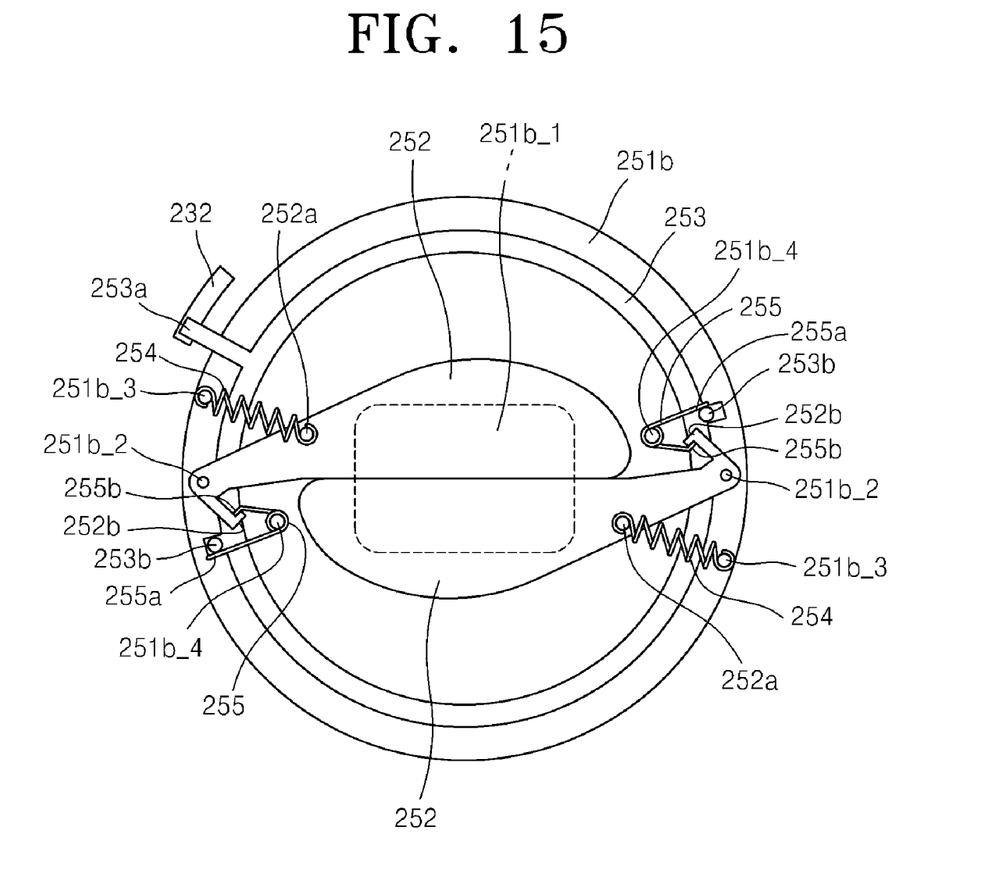
FIG. 15 is a plan view illustrating, except for the upper barrier support unit, that the barriers of the lens cap apparatus is in a completely closed state according to embodiments of the invention.

FIG. 10 is a plan view illustrating, except for the upper barrier support unit, that the barriers of the lens cap apparatus is in an open state according to an embodiments of the invention. FIG. 11 schematically illustrates that the operation protrusion starts to contact the inclined surface of the guide member, according to embodiments of the invention. FIG. 12 schematically illustrates that the operation protrusion contacts and slides along the inclined surface of the guide member, according to embodiments of the invention;

FIG. 13 is a plan view illustrating, except for the upper barrier support unit, that the barriers of the lens cap apparatus is the middle of changing from an open state to a closed state according to embodiments of the invention. FIG. 14 schematically illustrates that the operation protrusion reaches the end point of the inclined surface of the guide member, according to embodiments of the invention. FIG. 15 is a plan view illustrating, except for the upper barrier support unit, that the barriers of the lens cap apparatus is in a completely closed state according to embodiments of the invention.

A case in which the barriers 252 of the lens cap apparatus 250 are in an open state will be described below. The open state of the barriers 252 of the lens cap apparatus 250 signifies that the optical path is open. In this case, the power of the photographing apparatus 100 is "on" and the barrel 110 protrudes forward as illustrated in FIG. 8.

When the barriers 252 are open, as illustrated in FIG. 9, the operation protrusion 253a of the lens cap apparatus 250 and the guide member 230 are separated from each other. That is, although it is not illustrated, the barrel 110 and the lens cap apparatus 250 are coupled to each other so as to move together. Accordingly, as the barrel 110 moves forward, the lens cap apparatus 250 moves forward so that the operation protrusion 253a and the guide member 230 are separated from each other.

When the operation protrusion 253a and the guide member 230 are separated from each other, no force is applied to the operation protrusion 253a. Then, the barriers 252 are in the open state by the first elastic members 254 of the lens cap apparatus 250, which is described below in detail.

FIG. 10 is a plan view illustrating, except for the upper barrier support unit 251a, that the barriers 252 of the lens cap apparatus 250 is in an open state according to embodiments of the invention. Referring to FIG. 10, each of the barriers 252 is coupled to the hinge shaft 251b_2 of the lower barrier support portion 251b to be capable of rotating around the hinge shaft 251b_2, and connected to the first and second elastic members 254 and 255.

As described above, since no force is applied to the operation protrusion 253a, the barrier driving portion 253 is not rotated and stands still. Accordingly, no force is applied to the first elastic members 254 so that the first elastic members 254 may not be extended. Thus, as illustrated in FIG. 10, the barriers 252 connected to the first elastic members 254 are in the open state.

Next, the operation in which the barriers 252 of the lens cap apparatus 250 are changed from the open state to the closed state is described below. When a user turns off the power of the photographing apparatus 100 after using, as illustrated in FIG. 1, the barrel 110 retreats and thus the lens cap apparatus 250 is moved backward. As illustrated in FIG. 11, the operation protrusion 253a of the lens cap apparatus 250 is moved backward so as to contact the inclined surface 232 of the guide member 230.

As illustrated in FIG. 12, when the lens cap apparatus 250 further moves backward, the operation protrusion 253a slides along the inclined surface 232 and the movement direction of the operation protrusion 253a at this point is defined as $S_c$. The movement direction $S_c$ consists of two directional components of $S_z$ and $S_r$. The directional components $S_z$ and $S_r$ respectively denote the backward direction and the arc direction as illustrated in FIG. 13.

When the operation protrusion 253a slides along the inclined surface 232 and moves toward the directional component $S_r$, the barrier driving portion 253 connected to the operation protrusion 253a rotates counterclockwise. The rotational force of the barrier driving portion 253 is transferred to the second elastic member 255 through the projection portion 253b, thus applying a twist load to the second elastic member 255. The second elastic member 255 receives the twist load so that the end portion 255b of the second elastic member 255 may apply a load to the operation end portion 252b of each the barriers 252.

That is, as illustrated in FIG. 13, the second elastic member 255 applies a force to the operation end portion 252b of each of the barriers 252 to rotate each of the barriers 252. Each of the barriers 252 rotates clockwise around the hinge shaft 251b_2. As the barriers 252 move as above, the opening portion 251b_1 are gradually closed. The first elastic members 254 are extended to accumulate elastic potential energy.

As the lens cap apparatus 250 further moves backward, as illustrated in FIG. 14, the operation protrusion 253a further slides to reach the end of the inclined surface 232. In this case, as illustrated in FIG. 15, the barriers 252 are completed closed. As a result, the barriers 252 of the lens cap apparatus 250 are changed from the open state to the closed state.

When the user turns the photographing apparatus 100 on to use, the barrel 110 is moved forward. Then, the operation protrusion 253a and the guide member 230 are separated from each other. As the elastic potential energy of the first elastic member 254 accumulated during the closing of the barriers 252 is exerted, the barriers 252 are changed from the closed state to the open state.

Since the change of the barriers 252 from the closed state to the open state may be achieved by reversely performing the above-described operation to close the barriers 252, a detailed description thereon will be omitted herein.

As described above, in the operation of the lens cap apparatus 250, the barriers 252 are operated by the operation protrusion 253a and the guide member 230. According to the optical assembly 200 of embodiments, since the inclined surface 232 is formed on the end portion of the guide member 230 guiding the movement of the lens mounting member 210 and, when the lens cap apparatus 250 moved backward, the operation protrusion 253a slides along the inclined surface 232 so that the barrier driving portion 253 may be rotated, thus performing the closing operation of the barriers 252. Thus, the driving of the barriers 252 may be performed with a simple structure.

Also, due to a simple and efficient structure, not only manufacturing costs may be reduced, but the volume of the lens assembly 200 may be reduced. Accordingly, the installation space in the photographing apparatus 100 to install the lens assembly 200 may be reduced. Furthermore, the number of parts constituting the optical assembly 200 is reduced so that leakage of light in the barrel 110 may be prevented. Thus, the quality of a photographed image may be improved.

Figure 16:
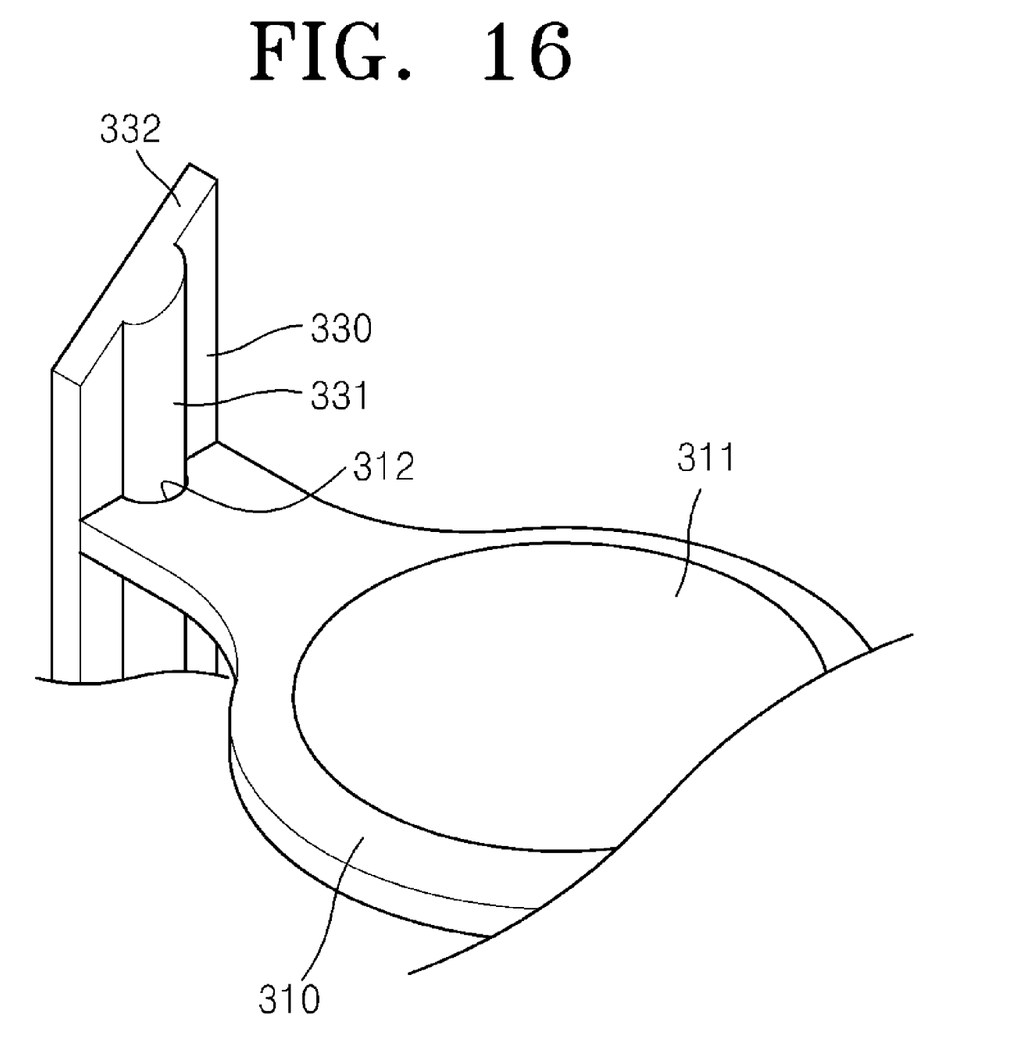
FIG. 16 is a magnified perspective view illustrating the guide member and the lens mounting member according to other embodiments of the invention.

FIG. 16 is a magnified perspective view illustrating a guide member 330 and a lens mounting member 310 according to other embodiments of the invention. In the following description of the guide member 330, only different portions from the guide member 230 of the above-described embodiment will be described herein.

The guide member 330 guides the movement of the lens mounting member 310. To this end, a guide protruding portion 331 is formed on the guide member 330 and a guide groove 312 in which the guide protruding portion 331 is inserted is formed on the lens mounting member 310. The lens mounting member 310 includes a lens 311 and an inclined surface 332 is formed on an end portion of the guide member 330.

The guide protruding portion 331 is formed along the guide member 330 so that the lens mounting member 310 may slide along the guide protruding portion 331. Since the guide slot 231 is not needed, the guide member 330 and the lens mounting member 310 according to embodiments may be easily manufactured compared to the guide member 230.

Since the other structures, operations, and effects of the photographing apparatus and the lens assembly according to embodiments are the same as those of the photographing apparatus 100 and the lens assembly 200 of the above-described embodiment, descriptions thereof will be omitted herein.

As described above, according to embodiments of the invention, since the optical assembly has a simple and efficient structure, manufacturing costs may be reduced and arrangement space may be minimized.

While embodiments of the invention have been particularly shown and described with reference to exemplary embodiments thereof, it will be understood by those skilled in the art that various changes in form and details may be made therein without departing from the spirit and scope of the appended claims.

What is claimed is:

1. An optical assembly comprising:
a lens mounting member on which at least one lens is mounted;
a transfer portion configured to move the lens mounting member;
a guide member configured to guide a movement of the lens mounting member;
a base member on which the transfer portion and the guide member are arranged; and
a lens cap apparatus having at least one barrier for opening and closing an optical path passing through the at least one lens,
wherein the lens cap apparatus is configured to open and close the barrier by contact with the guide member when the lens cap apparatus is moved closer to or farther from the base member.

2. The optical assembly of claim 1, wherein the transfer portion comprises:
a lead screw having a thread formed on an outer circumference thereof; and
a driving motor for rotating the lead screw, and
wherein the lens mounting member comprises a threaded portion contacting the thread of the lead screw.

3. The optical assembly of claim 1, wherein an inclined surface is formed on an end portion of the guide member, and
wherein the lens cap apparatus comprises:
a barrier driving portion configured to move the barrier; and
a barrier support portion rotatably connected to the barrier,
wherein the barrier driving portion comprises an operation protrusion formed to contact the inclined surface of the guide member.

4. The optical assembly of claim 3, wherein the lens cap apparatus is configured so that when the lens cap apparatus moves toward the base member, the operation protrusion contacts and slides down the inclined surface of the guide member, thereby rotating the barrier driving portion and closing the barrier.

5. The optical assembly of claim 3, wherein the lens cap apparatus is configured so that when the lens cap apparatus moves away from the base member, the operation protrusion moves up the inclined surface of the guide member, thereby rotating the barrier driving portion and opening the barrier.

6. The optical assembly of claim 1, wherein a guide protrusion is formed on the lens mounting member and a guide slot in which the guide protrusion is inserted is formed in the guide member.

7. The optical assembly of claim 1, wherein a guide groove is formed in the lens mounting member and a guide protruding portion inserted in the guide groove is formed on the guide member.

8. A photographing apparatus comprising:
a lens mounting member on which at least one lens is mounted;
a transfer portion configured to move the lens mounting member;
a guide member configured to guide a movement of the lens mounting member;
a base member on which the transfer portion and the guide member are arranged;
a lens cap apparatus having at least one barrier for opening and closing an optical path passing through the at least one lens;
an imaging device for converting image light passing through the lens to an electric signal; and
a control portion for controlling the transfer portion,
wherein the lens cap apparatus is configured to open and close the barrier by contact with the guide member when the lens cap apparatus is moved closer to or farther from the base member.

9. The photographing apparatus of claim 8, wherein the transfer portion comprises:
a lead screw having a thread formed on an outer circumference thereof; and
a driving motor for rotating the lead screw, and
wherein the lens mounting member comprises a threaded portion contacting the thread of the lead screw.

10. The photographing apparatus of claim 8, wherein an inclined surface is formed on an end portion of the guide member,
wherein the lens cap apparatus comprises:
a barrier driving portion configured to move the barrier; and
a barrier support portion rotatably connected to the barrier,
wherein the barrier driving portion comprises an operation protrusion formed to contact the inclined surface of the guide member.

11. The optical assembly of claim 10, wherein the lens cap apparatus is configured so that when the lens cap apparatus moves toward the base member, the operation protrusion contacts and slides down the inclined surface of the guide member, thereby rotating the barrier driving portion and closing the barrier.

12. The optical assembly of claim 10, wherein the lens cap apparatus is configured so that when the lens cap apparatus moves away from the base member, the operation protrusion moves up the inclined surface of the guide member, thereby rotating the barrier driving portion and opening the barrier.

13. The photographing apparatus of claim 8, wherein a guide protrusion is formed on the lens mounting member and a guide slot in which the guide protrusion is inserted is formed in the guide member.

14. The photographing apparatus of claim 8, wherein a guide groove is formed in the lens mounting member and a guide protruding portion inserted in the guide groove is formed on the guide member.

* * * * *